United States Patent

[11] 3,594,642

| [72] | Inventor | William B. Wright |
| | | Des Plaines, Ill. |
| [21] | Appl. No. | 803,043 |
| [22] | Filed | Feb. 27, 1969 |
| [45] | Patented | July 20, 1971 |
| [73] | Assignee | Sun Electric Corporation |
| | | Continuation-in-part of application Ser. No. 584,391, Oct. 5, 1966, now abandoned. |

[54] VEHICLE CHARGING, BATTERY, AND STARTING SYSTEM ANALYSIS METHOD AND APPARATUS
21 Claims, 9 Drawing Figs.

[52] U.S. Cl. .................................................. 324/158 R, 324/29.5, 324/73 R
[51] Int. Cl. ...................................................... G01r 31/00, G01r 15/12
[50] Field of Search .......................................... 324/158, 258 MG, 73, 29.5

[56] References Cited
UNITED STATES PATENTS

| 2,254,846 | 9/1941 | Heyer | 324/29.5 |
| 3,166,650 | 1/1965 | Heidrich | 324/29.5 X |
| 3,424,979 | 1/1969 | Stocker | 324/73 |

Primary Examiner—Rudolph V. Rolinec
Assistant Examiner—Ernest F. Karlsen
Attorney—Molinare, Allegretti, Newitt & Witcoff

ABSTRACT: A method and apparatus for analyzing the charging, starting and battery systems of a vehicle by using an analyzer connected by three cables to the systems being analyzed. The apparatus includes a DC voltmeter, an AC voltmeter, a DC ammeter, a load resistor, and an isolating resistor that are interconnected in the systems under test in various combinations by a single master switch to enable measurement of various parameters in the systems under test. Each cable preferably includes a current conductor and a voltage-sensing lead to enable measurement of voltage drops across elements of the systems under test without introducing errors resulting from voltage drops in the current conductors.

PATENTED JUL 20 1971

INVENTOR.
WILLIAM B. WRIGHT
BY Bair, Freeman & Molinare
ATTORNEYS

Fig. 5

INVENTOR.
WILLIAM B. WRIGHT
BY
Bair, Freeman & Molinare
ATTORNEYS

VEHICLE CHARGING, BATTERY, AND STARTING SYSTEM ANALYSIS METHOD AND APPARATUS

RELATED APPLICATION

This application is a continuation-in-part of U.S. application Ser. No. 584,391, now abandoned, entitled "GENERATOR TESTER" that was filed Oct. 5, 1966, in the name of William B. Wright, the above-identified applicant.

BACKGROUND OF THE INVENTION

This invention relates to vehicular test apparatus and is more specifically directed to techniques for analyzing the charging and starting system of a vehicle.

The automotive industry has long desired a method of rapidly and accurately analyzing vehicle starting and charging systems. Certain methods and devices for analyzing such systems are presently available, but each has exhibited certain deficiencies that have limited its usefulness. Basically, prior art methods and devices require a mechanic to disconnect or remove certain components of a charging or starting system before defects in the components can be accurately detected. As a result, the mechanic must frequently disconnect the leads and cables that join the various components of the system. Since the number and location of component leads vary from one vehicle to another, this undertaking requires considerable time and patience. Moreover, the leads are difficult to reconnect after the analysis is completed.

For example, with respect to vehicular generators, prior art devices and methods (which depend on the measurement of DC current and voltage) are generally unable to positively detect defects such as faulty diodes, stator windings, and brushes as long as the generator is mounted in the vehicle. In order to positively detect the presence of such defects, the generator must be completely removed from the vehicle, disassembled by hand, and inspected with its various components disconnected. This method of detection is obviously a time-consuming, difficult, and expensive undertaking. The deficiencies of prior art test methods in this regard are extremely serious since a generator having the above-described defects normally burns out an associated voltage regulator within a short period of time. Since conventional prior art methods (i.e., measuring generator DC voltage and current output) do not generally reveal the presence of regulator-damaging generator defects, a mechanic normally assumes that the regulator itself is at fault and replaces it with a new one. Of course, the replacement of the regulator under these circumstances only results in another regulator breakdown after a short period of time. Moreover, even if the mechanic suspects that the generator is defective, the inefficiency of the prior art test methods generally makes the detection of such defects economically infeasible. As a result, when a mechanic replaces the regulator, he is never sure that the root of the problem has been eliminated.

Aside from the deficiencies of the foregoing type, prior art methods and devices provide inaccurate voltmeter readings since they involve the connection of voltmeter leads to conductors carrying large amounts of current. As a result, the voltage drop in the conductor is reflected in the voltmeter reading so that accurate adjustment of critical components, such as a voltage regulator, is impeded.

SUMMARY OF THE INVENTION

Applicant has discovered that the entire starting and charging system of a vehicle can be accurately analyzed by connecting only three cables to the vehicle and by conducting appropriate tests. These tests measure the battery capacity, starter current draw, generator current output, voltage regulator setting, and generator condition. According to the apparatus aspect of the invention, the tests are performed by switching particular components into various relationships with respect to the three cables. In a preferred embodiment of the invention, the components involved in the tests basically comprise a DC voltage indicating means, an AC voltage indicating means, a DC current indicating means, an adjustable load resistor, an isolating resistor, and a switch means that interconnects the components according to the tests to be performed.

By choosing appropriate tests that are performed in an appropriate sequence, and by carefully designing the switch means so that proper components are connected in a proper relationship to the three cables, Applicant has been able to completely analyze a vehicle charging and starting system on a single hookup. In other words, after the three cables have been attached to appropriate points on the test vehicle, the entire charging and starting system may be analyzed by merely moving the switch means through its preselected positions.

By using the apparatus described herein, it is even possible to detect defects such as faulty diodes, stator windings, and brushes in a vehicular generator without disconnecting it from the vehicle. Applicant has discovered that a generator having such defects surprisingly produces characteristic periodic pulsating or AC currents that are not detected by prior art test methods. These pulsating currents provide a positive means of identifying such defects if the currents can be conveniently and economically measured. Applicant has discovered that the currents can, in fact, be measured accurately and inexpensively by placing a resistor in series with the generator and measuring the pulsating voltage developed across the resistor with an AC voltmeter. By properly regulating the sensitivity of the AC voltmeter (e.g., with a shunt resistor in parallel with the meter), the meter can be calibrated so that the presence of damaging pulsating current is positively detected. This method eliminates the need of using more expensive detecting equipment, such as an oscilloscope that requires the services of a highly trained operator.

The advantages of the above-described techniques are at once apparent. Since the connections of the cables are never changed during the test procedure, the hookup of test equipment is simplified so that even an unskilled mechanic rarely makes a mistake. Moreover, the entire test procedure can be conducted without disconnecting a single automotive component from the vehicle. This feature saves the mechanic hours of time that were previously spent in fruitless labor.

According to another feature of the present invention, each of the three cables attached to the test vehicle comprises a current conductor and a voltage-sensing lead. The conductor and lead are connected at a point adjacent the vehicle, but are thereafter insulated from each other throughout their entire lengths. The current conductor is connected to components of the invention that carry relatively large amounts of current. However, the voltage-sensing lead is connected only to the voltage-indicating means so that virtually no current is carried by the lead. As a result, the voltage-indicating means records the voltage produced at various points on the test vehicle with a degree of accuracy unequailed in prior art devices of this type. This feature significantly increases the accuracy with which critical components, such as voltage regulators, may be adjusted.

DESCRIPTION OF THE DRAWINGS

These and other advantages and features of the present invention will hereafter appear for purposes of illustration, but not of limitation, in connection with the accompanying drawings in which like reference numbers refer to like parts throughout, and in which.

DESCRIPTION OF THE PREFERRED EMBODIMENTS

Figures 1, 2, 3, 4:
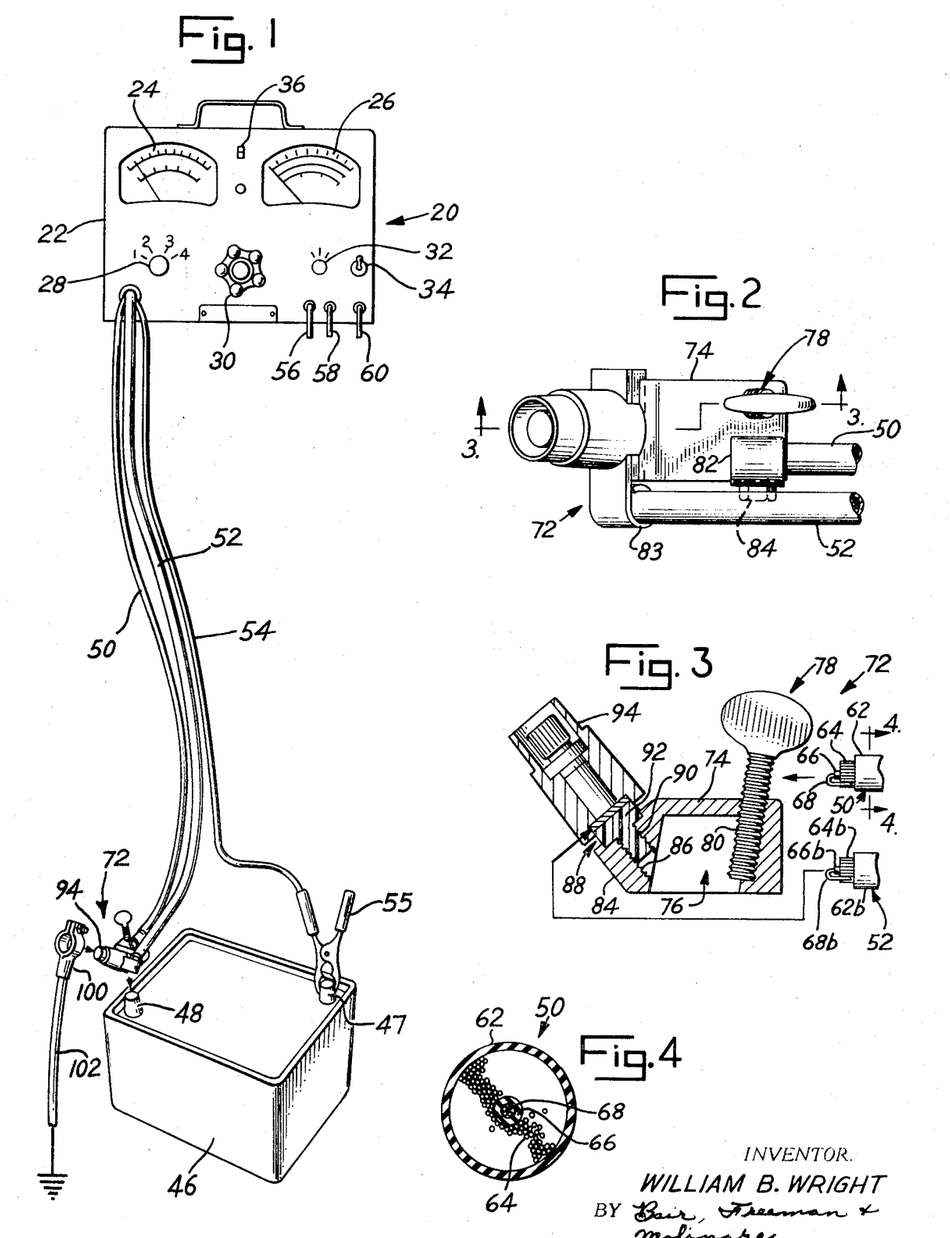
FIG. 1 illustrates a preferred form of a control panel, cables, and adapter fixture designed in accordance with the present invention, together with the manner in which the cables and adapter fixture are interconnected with an exemplary vehicle battery.
FIG. 2 is a top plan view of the adapter fixture shown in FIG. 1.
FIG. 3 is a cross-sectional view taken along line 3—3 of FIG. 2 that also schematically illustrates the manner in which certain cables of the present invention are connected at their end points.
FIG. 4 is a cross-sectional view, taken along line 4—4 of FIG. 3, of a preferred form of cable used in connection with the present invention.

As best shown in FIG. 1, a preferred form of apparatus made in accordance with the present invention is preferably contained in a cabinet 20 that includes a front panel 22. The front panel is fitted with a current-indicating microammeter 24 (hereafter called ammeter 24), a voltage-indicating microammeter 26 (hereafter called voltage meter 26), and several knobs and switches that control the operation of the apparatus. More specifically, the apparatus includes a test selector knob 28 that controls a master switch for determining the manner in which various circuit components are interconnected, a load increase knob 30 that controls the operation of an adjustable load resistor, a volt selector knob 32 that controls the operation of voltage meter 26, a field control switch 34, and a ground polarity switch 36.

The apparatus also includes external voltmeter leads 56 and 58 and a field lead 60 that may be connected to the field terminal of a vehicle generator (i.e., either a DC generator or an alternator) in order to conduct certain specialized tests.

As shown in FIG. 1, the apparatus includes cables 50, 52, and 54 that are used in connection with a vehicle battery 46 having an ungrounded positive terminal 47 and a normally grounded negative terminal 48. Cable 54 terminates in a gripper member 55 that is attached to positive terminal 47, and cables 50 and 52 terminate in an adapter fixture 72 that is connected to negative terminal 48. A vehicle starting and charging system including battery 46 may be analyzed according to the method aspect of the present invention by connecting the cables in the manner shown.

Cables 50, 52 and 54 are identical and each may be understood with reference to FIG. 4 that illustrates the construction of cable 50. Referring to FIG. 4, cable 50 basically comprises an insulating outer covering 62, a conductor 64 consisting of multiple strands of wire, an insulating inner covering 66, and a voltage-sensing lead 68 that is electrically insulated from current conductor 64 by covering 66. In like manner, cable 52 (FIG. 3) comprises an insulating outer covering 62b, a current conductor 64b, an insulating inner covering 66b, and a voltage-sensing lead 68b. Cable 54 (FIG. 5) is fabricated in an identical manner and basically comprises a current conductor 64c and a voltage-sensing lead 68c that are separated by an insulating inner covering analogous to inner covering 66.

As best shown in FIGS. 1—3, cables 50 and 52 are connected to an adapter fixture 72. Fixture 72 basically comprises a frame 74 that defines a bore 76 adapted to receive negative terminal 48. Frame 74 may be securely fastened to negative terminal 48 by means of a threaded bolt 84 and a wingnut 78 that has a threaded end 80 adapted to extend into bore 76. Frame 74 is fitted with a hollow cylindrical clamp 82 that is adapted to receive cable 50. As illustrated in FIG. 3 (wherein cable 50 is shown removed from clamp 82) voltage-sensing lead 68 is attached to current conductor 64 in the portion of cable 50 that is fitted into clamp 82. As a result, conductor 64 and lead 68 are electrically connected to the negative terminal through frame 74. However, due to the presence of inner covering 66, the conductor and lead are insulated from each other throughout the remaining portion of their lengths.

Frame 74 also includes an end wall 84 that has a threaded channel 86 cut therein. Channel 86 receives the threaded end 90 of a bolt 88 that is fabricated from electrical insulating material. Bolt 88 also comprises a head 92 that is made from insulating material and is used to mount a post member 94. As a result of the foregoing construction features, post member 94 is electrically insulated from frame 74. Post member 94 also includes a hollow cylindrical clamp 83 that is adapted to secure cable 52.

As best shown in FIG. 3, voltage-sensing lead 68b and current conductor 64b of cable 52 are connected together at the portion of the cable in contact with clamp 83. As a result, both conductor 64b and lead 68b are electrically connected to post member 94. However, the conductor and lead are insulated throughout the remaining portion of their lengths due to the presence of inner covering 66b. As best shown in FIG. 1, post member 94 is adapted to receive a conventional clamp 100 of a battery ground cable 102.

In order to completely analyze the starting and charging system of a vehicle incorporating battery 46, clamp 100 of ground cable 102 is removed from negative terminal 48, and fixture 72 is attached to the negative terminal in its place in the manner previously described. Grip member 55 is attached to positive terminal 47 without disconnecting the cable already attached to this terminal.

Figure 5:
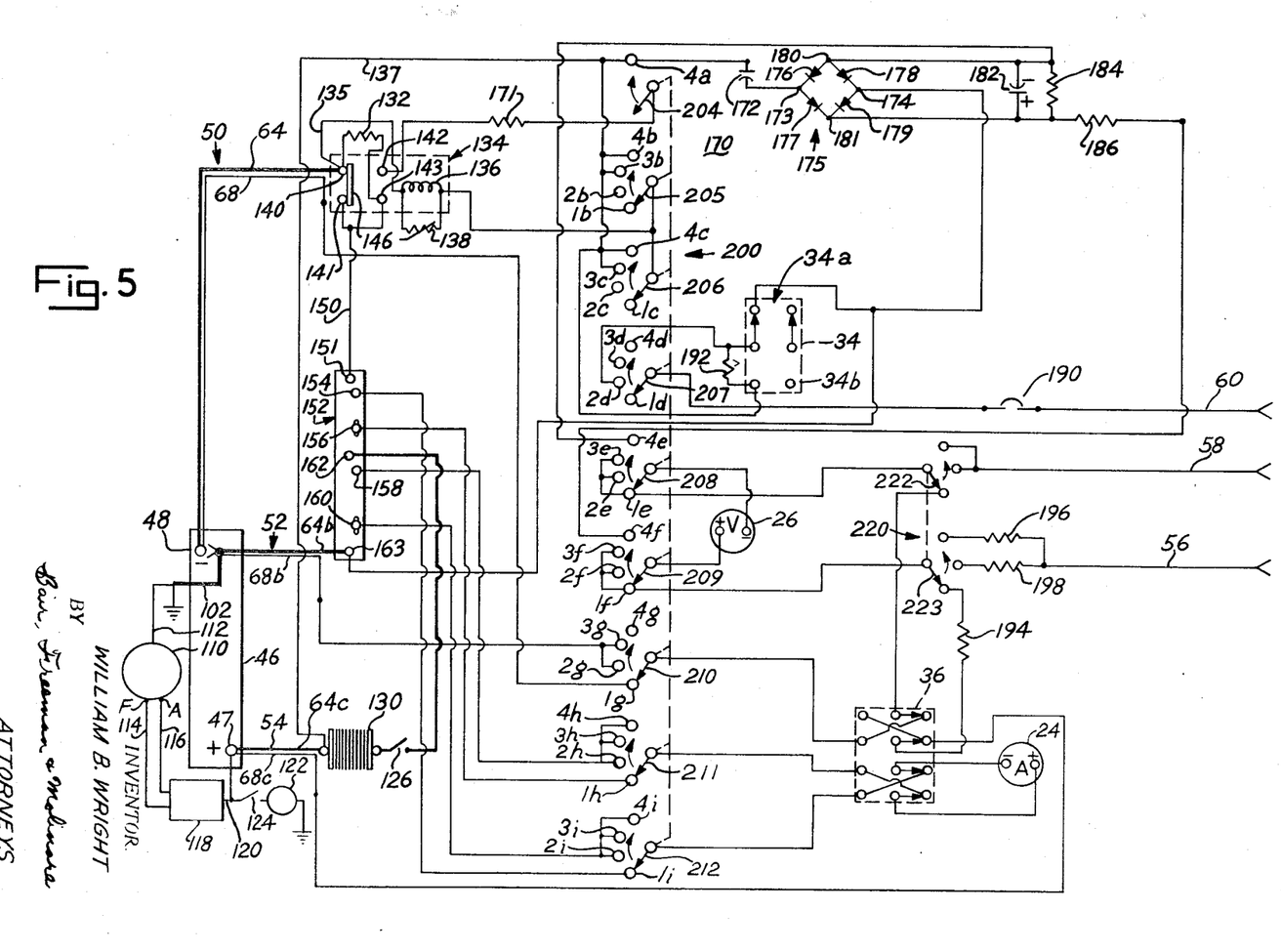
FIG. 5 is a schematic drawing showing a preferred form of electrical apparatus made in accordance with the present invention, together with the manner in which the apparatus is interconnected with an exemplary vehicle starting and charging system.

After cables 50, 52, and 54 are attached in the manner described, the apparatus of the present invention is interconnected with various components of the starting and charging system of the vehicle in the manner illustrated in FIG. 5. More specifically, cable 50 is electrically connected to negative terminal 48, cable 52 is electrically connected to ground cable 102, and cable 54 is electrically connected to positive terminal 47. Ordinarily, the vehicle has a generator 110 (i.e., either a DC generator or an alternator) connected to the battery cable 102 through a conductor 112. The generator generally has a field terminal F and an armature terminal A that are connected to a voltage regulator 118 through conductors 114 and 116, respectively. Voltage regulator 118, in turn, is connected over a conductor 120 to positive terminal 47. In addition, a starter motor of the vehicle 122 is connected between ground potential and conductor 120 through an ignition switch 124. It should be noted that battery 46, ground cable 102, generator 110, voltage regulator 118, and starter motor 122 do not form a part of the present invention and are merely illustrated in order to more fully describe the use of the present invention.

As shown in FIG. 5, the preferred form of the present invention also includes an adjustable load resistor 130 that is connected in series with a switch 126 between current conductor 64c and a terminal 162 of a shunt member 152. The resistance value of load resistor 130 may be adjusted by turning load increase knob 30. When knob 30 is moved to its off position, the switch 126 is opened so that no current flows through resistor 130.

The apparatus also includes an isolating resistor 132 (having a value of 0.25 ohms) and a relay 134 that has a coil 136 connected to current conductor 64 through a conductor 135. Relay 134 also comprises a resistor 138 connected in parallel with coil 136, and relay contacts 140—143. A slide connector 146 is adapted to move between contact pairs 140, 141 and 142, 143 in response to the energization of coil 136. Relay 134 provides a unique method of controlling the interconnection of isolating resistor 132 with cables 50 and 52 to achieve automatic isolation of battery 46 from the other components of the vehicle. This unique feature of the invention automatically establishes a proper current through the battery and simplifies the test procedure used in connection with the invention.

Relay contact 141 is connected over a conductor 150 to a terminal 151 of shunt member 152. The shunt member is used to establish an appropriate voltage between terminals 154 and 156 and between terminals 158 and 160 so that an appropriate amount of current is conducted through ammeter 24 during various test procedures. The shunt member also establishes a current path between terminal 151 and terminal 162 (to which load resistor 130 is connected), and between terminal 162 and terminal 163 that is connected to current conductor 64b. The shunt member is preferably fabricated from manganin that is treated so as to produce a voltage drop of approximately 50 millivolts between terminals 154 and 156 when the apparatus is connected to a typical vehicle starting and charging system. The arrangement of the shunt member terminals and load resistor 130 in the manner described enables the entire test procedure to be controlled by a single master switch and improves the accuracy of ammeter 24.

The present invention also includes an AC voltmeter circuit 170 that enables a mechanic to discover a defective vehicle generator without disconnecting the generator from the test vehicle. Circuit 170 comprises a resistor 171 (having a value of 1.2 ohms) and a capacitor 172 that is connected in series with the input terminals 173, 174 of a full wave rectifier 175. Rectifier 175 comprises diodes 176—179 and has output terminals 180, 181 that are connected between a capacitor 182 and a resistor 184. Circuit 170 also comprises a resistor 186 that is connected to output terminal 181. Circuit 170, of course, converts periodic pulsating or AC voltages to DC voltages that can be indicated by voltage meter 26. In other words, the combination of voltage meter 26 and circuit 170 operates as an AC voltmeter.

The apparatus illustrated in FIG. 5 also comprises a circuit breaker 190 that is connected in series with field lead 60. Resistors 96 and 98 are connected in series with lead 56 in order to control the voltage range of voltage meter 26, and resistor 194 may be connected in series with voltage meter 26 in order to limit the current flowing through the meter to appropriate levels. That is, the series combination of voltage meter 26 and resistor 194 operates as a DC voltmeter.

The interconnection of the foregoing components is controlled by a master switch 200 that is connected to test selector knob 28. Switch 200 includes contact arms 204—212. Each of the contact arms may be moved through four positions that are identified in FIG. 5.

The connection of voltage meter 26 is also controlled by a switch 220 that is connected to volt selector knob 32. Switch 220 comprises contact arms 222 and 223, each of which may be moved through three positions as shown in FIG. 5.

The operation of the above-described apparatus together with the method aspect of the present invention will now be described assuming that cables 50, 52 and 54 have been attached to a test vehicle in the manner previously indicated. When the cables are connected in the manner described, the relationship between the apparatus of the preferred embodiment and the various components of the test vehicle is as shown in FIG. 5.

In order to test the starting and charging system of the vehicle, master switch 200 is moved to its first position (i.e., the position shown in FIG. 5 in which contact arms 205—212 are connected with terminals 1b—1i, respectively), and switch 220 is moved to the position in which resistor 194 is connected in series with voltage meter 26 (i.e., the position shown in FIG. 5). If the test vehicle uses a negative ground system, switch 36 is moved to the position shown in FIG. 5. However, if the test vehicle uses a positive ground system, the position of switch 36 is reversed. Since field lead 60 is not connected at this time, the position of switch 34 is immaterial. At this time, the mechanic should remove the ignition coil high-tension lead from the distributor cap of the test vehicle and connect the lead to engine ground. Grounding the coil lead prevents the engine from starting and the coil tower from arching.

Figure 6:
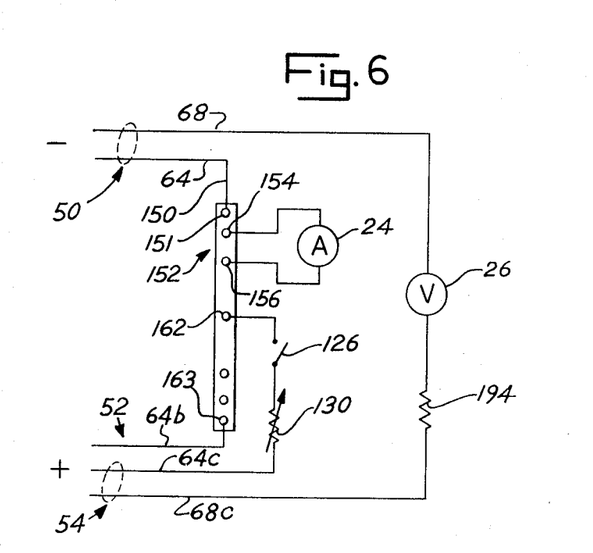
FIG. 6 is a schematic drawing of the circuit established by the location of the master switch means of the present invention in its first position.

When master switch 200 is moved to its first position, the components shown in FIG. 5 are interconnected with the cables in the manner described in FIG. 6. In other words, when the mechanic moves master switch 200 to its first position, he connects the series combination of load resistor 130 and ammeter 24 between current conductors 64 and 64c. In addition, he connects voltage meter 26 (and resistor 194) between voltage-sensing leads 68 and 68c. At this time, the mechanic should turn the load increase knob 30 until a current of three times the vehicle ampere-hour requirement is drawn from battery 46 and observed on ammeter 24. This load should be maintained for approximately 15 seconds while observing the voltage reading on voltage meter 26. By performing the foregoing test, the mechanic gains detailed knowledge of the capacity of battery 46.

The mechanic then returns the load increase knob to its off position and closes switch 124 (FIG. 5) so that the starter motor 122 is energized. The mechanic cranks the engine by means of motor 122 for 10 seconds while observing the readings on ammeter 24 and voltage meter 26.

By performing the foregoing tests, the mechanic may determine the starter-cranking voltage and the starter current draw. If the tests indicate that the battery or starter motor of the test vehicle is defective, additional tests may be performed in order to isolate the difficulty.

The mechanic next reconnects the coil high-tension lead at the distributor of the test vehicle, starts the engine of the vehicle, and maintains a speed of approximately 2,000 r.p.m. The mechanic then turns test selector knob 28 so that master switch 200 is moved from its first to its second position (i.e., the position in which contact arms 205—212 are moved into contact with terminals 2b—2i, respectively). As a result, the components shown in FIG. 6 are momentarily disconnected and are subsequently interconnected with cables 50, 52, and 54 in the manner shown in FIG. 7.

Figure 7:
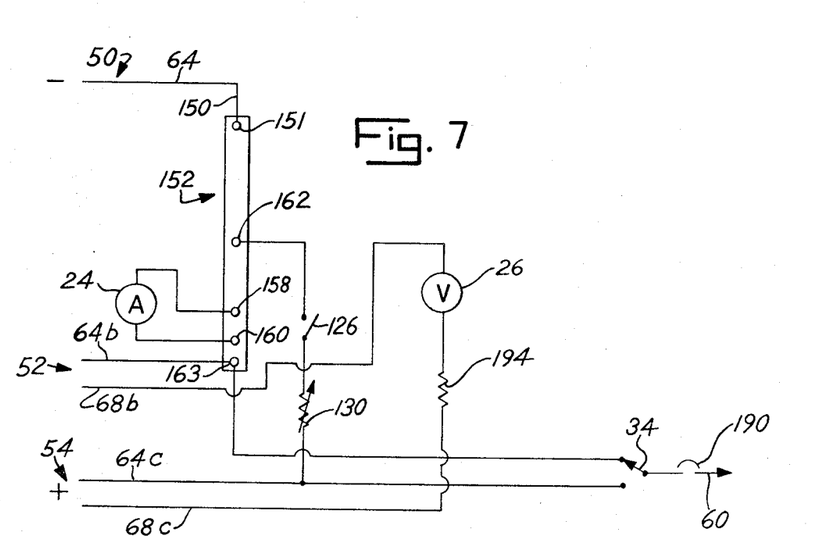
FIG. 7 is a schematic drawing of the circuit completed by the location of the master switch means of the present invention in its second position.

In other words, by moving master switch 200 to its second position, the mechanic operatively connects load resistor 130 between current conductors 64 and 64c and operatively connects ammeter 24 between current conductors 64 and 64b. Actually, resistor 130 is connected to terminal 162 of shunt member 152. However, the resistance of the shunt member is so low that the resistor is in effect connected to current conductor 64 through the current path provided by the shunt member. Likewise, although ammeter 24 is connected between terminals 158 and 160, it effectively measures the entire current flowing between current conductors 64 and 64b (i.e., the current flowing in the current path between terminals 162 and 163).

When the test vehicle is operating in the manner indicated, the total current drawn from the generator through conductors 64b and 64c is observed on ammeter 24 to determine whether the current meets specifications. When the current is less than specified, the mechanic slowly rotates load increase knob 30 until the highest ammeter reading is obtained. The load increase knob is then returned to its off position so that switch 126 interrupts the current flowing through load resistor 130.

It should also be noted that the movement of master switch 200 to its second position connects voltage meter 26 between voltage-sensing leads 68b and 68c. However, the use of the voltage meter is not necessary in order to perform the above-described test procedure on most vehicles. If the foregoing test indicates a problem, more detailed tests may be performed in order to isolate the difficulty. For example, if the test indicates that the current put out by the generator is too low, field lead 60 is connected to field terminal F in order to independently energize the stator field of generator 110. If the current still remains too low, a defect in the generator is indicated, whereas return of the current to a proper value generally indicates a defect in the voltage regulator. Of course, switch 34 must be adjusted in order to properly energize field lead 60.

Figure 8:
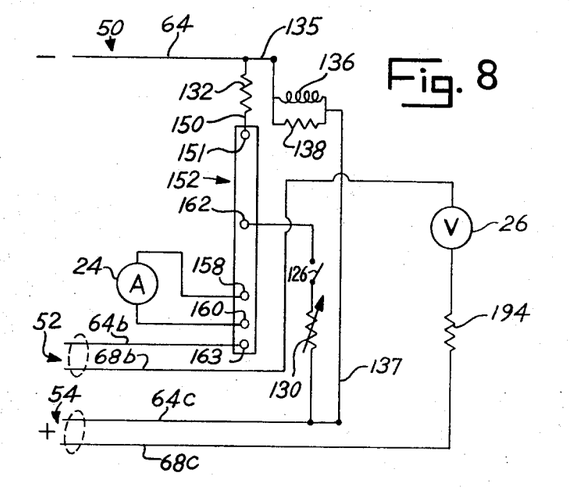
FIG. 8 is a schematic drawing of the circuit completed by the location of the master switch means of the present invention in its third position.

The mechanic then turns test selector knob 28 so that master switch 200 is moved from its second to its third position whereby components of the invention are momentarily disconnected from the arrangement shown in FIG. 7 and are reconnected in the arrangement shown in FIG. 8. In other words, when master switch 200 is moved from its second to its third position (i.e., the position in which contact arms 205—212 are moved into contact with terminals 3b—3i, respectively), the mechanic effectively isolates battery 46 from generator 110 and voltage regulator 118 by the connection of isolating resistor 132, so that the current flow through the battery is limited to a predetermined amount, and the voltage produced by the generator increases to the maximum setting of the voltage regulator. More specifically, when master switch 200 is in its third position, relay coil 136 is connected from current conductor 64 through conductor 137 to current conductor 64c. As a result, slide connector 146 moves from the position shown in FIG. 5 to connect relay contacts 142 and 143. Isolating resistor 132 is then placed in series with shunt member 152 and is operatively connected between current conductors 64 and 64b. In addition, load resistor 130 is connected between current conductor 64c and terminal 162, so that it is operatively connected between current conductors 64b and 64c. Voltage meter 26 is connected between voltage-sensing lead 68b and voltage-sensing lead 68c so that the exact voltage put out by the voltage regulator may be determined.

As previously explained, the provision of the voltage-sensing leads enables the present invention to read voltages with increased accuracy. If voltage meter 26 were connected to the current conductors, inaccurate readings would result since the conductors normally exhibit a 1—3 volt drop in potential between their end points due to the large quantity of current carried.

After the master switch 200 is moved to its third position, the mechanic reduces the engine speed of the test vehicle to idle. Voltage regulator 118 is then cycled by rotating load increase knob 30 until voltage meter 26 indicates a drop in the system voltage of 6 volts on a 12-volt system or 3 volts on a 6-volt system. The mechanic then returns load increase knob 30 to its off position so that switch 126 is open. The mechanic next returns the engine speed to approximately 2,000 r.p.m. and observes the DC voltage reading on voltage meter 26 which is compared with the manufacturer's specifications. Because of the unique voltage-sensing leads provided by the present invention, the voltage reading obtained by the foregoing test procedure is extremely accurate and does not vary with the amount of current flowing through the current conductors of the cables. As a result, the voltage regulator may be adjusted with a degree of accuracy heretofore unattainable. Of course, more detailed tests may be performed if the foregoing test indicates that the voltage regulator is defective.

After the foregoing voltage regulator test meets specifications, the mechanic operates test selector knob 28 so that master switch 200 is moved from its third to its fourth position. As a result, the components of the invention are momentarily disconnected from the arrangement shown in FIG. 8 and are reconnected in the arrangement shown in FIG. 9. When the mechanic moves master switch 200 from its third to its fourth position (i.e., the position in which contact arms 204—212 are moved into contact with terminals 4a—4i, respectively), AC voltmeter circuit 170 is connected across the generator (i.e., between current conductors 64b and 64c) in order to detect defects therein. Applicant has found that the use of this step in the test procedure is valuable for locating defective generators that rapidly burn out voltage regulators until the error is corrected. Prior to the invention of this method and apparatus (which is described in the related application referred to herein), such defects in generators could be detected only by disassembly of the generator. However, by use of circuit 170 and isolating resistor 132, applicant has found that mechanics having little skill can immediately detect the presence of such damaging defects.

Figure 9:
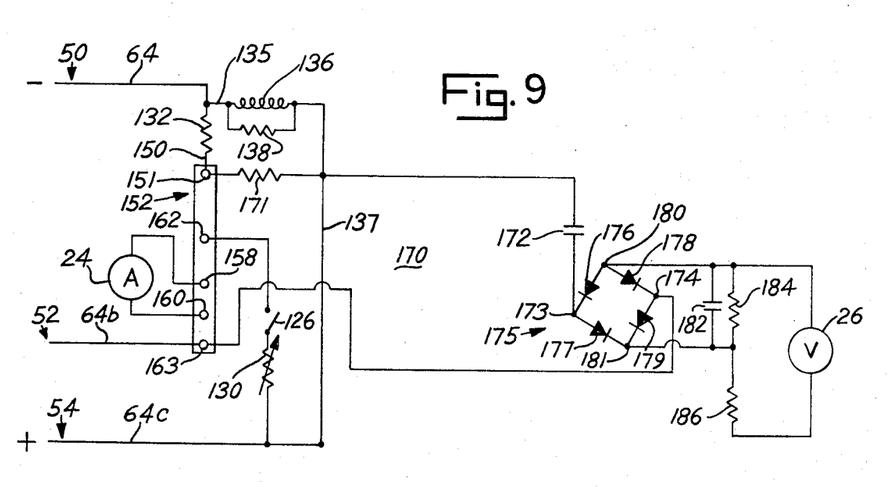
FIG. 9 is a schematic drawing of the circuit completed by the location of the master switch means of the present invention in its fourth position.

As shown in FIG. 9, movement of master switch 200 to its fourth position connects the series combination of capacitor 172 and the input terminals 173, 174 of full wave rectifier 175 between current conductors 64b and 64c. In addition, isolating resistor 132 is connected in series with shunt member 152 and is therefore operatively connected between current conductors 64 and 64b. Resistor 171 is connected from terminal 151 to current conductor 64c so that it is effectively connected across the input of circuit 170. Resistor 171 regulates the sensitivity of circuit 170 to provide a go, no-go test capability. Voltage meter 26 is connected through resistor 186 to the output terminals 180 and 181 of full wave rectifier 175. Capacitor 182 and resistor 184 are placed across the output terminals in order to filter the output signals thereof.

When the apparatus is connected in the manner indicated, circuit 170 acts as an AC voltmeter, and the mechanic merely reads the proper scale on voltage meter 26 in order to determine whether excessive periodic pulsating voltage is being produced by generator 110. Accordingly, the mechanic may detect a damaging defect in the generator without disconnecting a single lead thereof.

As a means of checking the overall wiring system of the vehicle, the mechanic normally operates test selector knob 28 so that master switch 200 is returned to its second position described previously. The engine speed is then returned to idle, and the ignition switch 124 is opened (i.e., returned to its off position). Lights and accessories of the test vehicle are turned off, and the doors are closed. The mechanic then observes the reading on ammeter 24. An unusually high reading on the ammeter indicates that the battery is being drained by a defect in the wiring system of the test vehicle.

Those skilled in the art will appreciate that the foregoing test method enables the mechanic to completely analyze the charging and starting system of a test vehicle by connecting only three cables to the vehicle with a single hookup. In addition, the unique voltage-sensing leads of this invention enable the mechanic to adjust the voltage regulator of the vehicle with a degree of accuracy heretofore unattained. Moreover, any damaging periodic voltage being produced by the generator may be immediately detected without disconnecting any leads.

Of course, many other detailed tests may be performed on suspected defective parts of the test vehicle by use of the illustrated apparatus. Some of these tests may be performed by using external voltage leads 58 and 56. When using these leads, switch 220 is adjusted to an appropriate output position. For example, when voltage meter 26 is connected through resistor 198, the current through the meter is limited so that the meter reads on an appropriate scale. Likewise, when the meter is connected through resistor 196, the meter may be used for making precise voltage tests, such as battery cell tests.

Those skilled in the art will appreciate that the apparatus described herein, when used to perform tests in the manner described above, provides a trouble-free, accurate, reliable and easy-to-use technique of analyzing vehicle starting in charging systems. Those skilled in the art will also realize that certain components of the apparatus and certain aspects of the method described herein may be altered without departing from the spirit and scope of the invention.

What I claim is:

1. Apparatus for analyzing a vehicle charging and starting system consisting of a starter, a generator having a field terminal, a voltage regulator, a battery having ungrounded and normally grounded terminals, and a battery ground cable, said apparatus comprising in combination:
   a first cable adapted to be connected to the normally grounded terminal of the battery;
   a second cable adapted to be connected to the battery ground cable;
   a third cable adapted to be connected to the ungrounded terminal of the battery;
   first means for drawing a predetermined amount of current from the battery through the first and third cables and simultaneously measuring the DC voltage between the first and third cables so that the battery capacity, starter cranking voltage, and starter current draw of the system is measured;

second means for drawing current from the generator through the second and third cables, and for measuring the DC current that flows from the generator;

third means for measuring the DC voltage produced by the voltage regulator between the second and third cables and simultaneously controlling the current flow through the battery so that the voltage produced by the generator increases to the maximum setting of the voltage regulator; and fourth means for connecting a resistance in series with the generator between the first and second cables and simultaneously measuring the AC voltage produced by the generator across the resistor.

2. Apparatus, as claimed in claim 1, wherein said first means comprises:
DC voltage indicating means;
DC current indicating means;
an adjustable load resistor;
switch means for connecting the series combination of said load resistor and said DC current indicating means between said first and third cables; and
switch means for connecting said DC voltage indicating means between said first and third cables.

3. Apparatus, as claimed in claim 1, wherein said second means comprises:
DC current indicating means;
an adjustable load resistor;
switch means for operatively connecting said load resistor between said first and third cables; and
switch means for operatively connecting said DC current indicating means between said first and second cables.

4. Apparatus, as claimed in claim 3, wherein said second means further comprises switch means for connecting said DC voltage indicating means between said second and third cables.

5. Apparatus, as claimed in claim 1, wherein said third means comprises:
DC voltage indicating means;
an adjustable load resistor;
an isolating resistor;
switch means for operatively connecting said isolating resistor between said first and second cables;
switch means for operatively connecting said load resistor between said second and third cables; and
switch means for connecting said DC voltage indicating means between said second and third cables.

6. Apparatus, as claimed in claim 5, wherein the third means further comprises means for interconnecting a relay coil with at least two of said cables, said relay coil being adapted to control the interconnection of the isolating resistor.

7. Apparatus, as claimed in claim 1, wherein said fourth means comprises:
AC voltage indicating means;
switch means for operatively connecting said resistance between said first and second cables; and
switch means for connecting said AC voltage indicating means between said second and third cables.

8. Apparatus, as claimed in claim 7, wherein said fourth means further comprises switch means for operatively connecting a resistor between said second and third cables.

9. Apparatus, as claimed in claim 1, wherein said second means further comprises means for electrically connecting said field terminal to one of said cables.

10. Apparatus, as claimed in claim 1, and further comprising a fixture for use in connection with the normally grounded terminal of the battery, said fixture comprising:
frame means defining a bore adapted to receive said normally grounded terminal;
means for securing said normally grounded terminal in said bore;
means for connecting said first cable to said frame means;
a post member adapted to receive said battery ground cable;
means for connecting said second cable to said post member; and
means comprising electrical insulating material for connecting said post member to said frame means.

11. Apparatus for analyzing a vehicle charging and starting system consisting of a starter, a generator having a field terminal, a voltage regulator, a battery having ungrounded and normally grounded terminals, and a battery ground cable, said apparatus comprising in combination:
a first cable adapted to be connected to the normally grounded terminal of the battery, said first cable comprising a first current conductor and a first voltage-sensing lead that are electrically insulated from each other except at a point adjacent the normally grounded terminal;
a second cable adapted to be connected to the battery ground cable, said second cable comprising a second current conductor and a second voltage-sensing lead that are electrically insulated from each other except at a point adjacent the battery ground cable;
a third cable adapted to be connected to the ungrounded terminal of the battery, said third cable comprising a third current conductor and a third voltage-sensing lead that are electrically insulated from each other except at a point adjacent the ungrounded terminal;
DC voltage indicating means;
DC current indicating means;
an adjustable load resistor;
an isolating resistor;
AC voltage indicating means;
first means for interconnecting the load resistor and DC current indicating means with at least two of said current conductors, and for interconnecting the DC voltage indicating means with at least two of said voltage-sensing leads so that the battery capacity, starter-cranking voltage, and starter current draw of the system is measured;
second means for interconnecting the load resistor and DC current-indicating means with at least two of the current conductors so that the current output of the generator is measured;
third means for interconnecting the isolating resistor with at least two of said current conductors, and for interconnecting the DC voltage indicating means with at least two of the voltage-sensing leads so that the current flow through the battery is controlled and the voltage produced by the generator increases to the maximum setting of the voltage regulator; and
fourth means for interconnecting the isolating resistor and AC voltage indicating means with at least two of said cables so that any periodic pulsating voltage being produced by the generator is detected.

12. Apparatus, as claimed in claim 11, wherein said first means comprises:
means for connecting the series combination of said DC current indicating means and said load resistor between said first and third current conductors; and
means for connecting said DC voltage indicating means between said first and third voltage sensing leads.

13. Apparatus, as claimed in claim 11, wherein said second means comprises:
means for connecting the series combination of said load resistor and a current path between said first and third current conductors; and
means for connecting said DC current indicating means between said second current conductor and the junction of said load resistor and said current path.

14. Apparatus, as claimed in claim 13, wherein the current path is fabricated from manganin.

15. Apparatus, as claimed in claim 11, wherein said third means comprises:
means for connecting the series combination of said isolating resistor and said load resistor between said first and third current conductors;

means for connecting a current path between said second current conductor and the junction of said load resistor and said isolating resistor; and means for connecting said DC voltage indicating means between said second and third voltage sensing leads.

16. Apparatus, as claimed in claim 11, wherein said fourth means comprises:

means for connecting said isolating resistor between said first and second current conductors; and means for connecting said AC voltage indicating means between said second and third current conductors.

17. A method of analyzing a vehicle charging and starting system consisting of a starter, a generator having a field terminal, a voltage regulator, and a battery, said method comprising the steps as follows:

drawing a predetermined amount of current through the battery and simultaneously measuring the DC voltage across the battery;

cranking the engine of the vehicle and simultaneously measuring the DC current drawn by the starter thereof;

starting the engine of the vehicle, placing an increasing load across the generator, and measuring the largest DC current that flows through the generator;

controlling the current flow through the battery so that the voltage produced by the generator increases to the maximum setting of the voltage regulator, and simultaneously measuring the DC voltage produced by the voltage regulator;

connecting a resistor in series with the generator and measuring the AC voltage produced across the resistor by the generator.

18. A method, as claimed in claim 17, wherein the steps are performed in the exact order described in claim 17.

19. A method of analyzing a vehicle charging and starting system consisting of a starter, a generator having a field terminal, a voltage regulator, a battery having ungrounded and normally grounded terminals, and a battery ground cable by use of first, second, and third cables, said method comprising the steps of:

disconnecting the battery ground cable from the normally grounded terminal of the battery;

connecting the first cable to the normally grounded terminal of the battery;

connecting the second cable to the battery ground cable;

connecting the third cable to the ungrounded terminal of the battery;

drawing a predetermined amount of current from the battery through the first and third cables and simultaneously measuring the DC voltage between the first and third cables;

drawing current through the first and third cables by cranking the engine of the vehicle and simultaneously measuring the DC current flowing in the first and third cables;

starting the engine of the vehicle, drawing current from the generator by placing an increasing electrical load between the second and third cables, and measuring the largest DC current that flows through the second cable;

controlling the current flow between the first and second cables so that the voltage produced by the generator increases to the maximum setting of the voltage regulator, and simultaneously measuring the DC voltage between the second and third cables; and connecting a resistance between the first and second cables and simultaneously measuring the AC voltage produced by the generator between the second and third cables.

20. Apparatus, as claimed in claim 1, wherein the first means comprises means for drawing a predetermined amount of current from the battery through one of the first and third cables and for returning said current to the battery through the other of said first and third cables and for simultaneously measuring the DC voltage between the first and third cables so that the battery capacity, starter-cranking voltage and starter current draw of the system is measured.

21. Apparatus, as claimed in claim 1, wherein the second means comprises means for drawing current from the generator through one of the second and third cables and for returning current to the generator through the other of said second and third cables and for measuring the DC current that flows from the generator.